United States Patent
Nakatsu (10) Patent No.: US 10,136,003 B2
(45) Date of Patent: Nov. 20, 2018

(54) IMAGE FORMING SYSTEM, IMAGE FORMING APPARATUS, AND NON-TRANSITORY COMPUTER READABLE RECORDING MEDIUM STORING GUIDE PROGRAM

(71) Applicant: KYOCERA Document Solutions Inc., Osaka (JP)

(72) Inventor: Kenta Nakatsu, Osaka (JP)

(73) Assignee: Kyocera Document Solutions, Inc. (JP)

(*) Notice: Subject to any disclaimer, the term of this patent is extended or adjusted under 35 U.S.C. 154(b) by 0 days.

(21) Appl. No.: 15/881,598

(22) Filed: Jan. 26, 2018

(65) Prior Publication Data
US 2018/0220011 A1      Aug. 2, 2018

(30) Foreign Application Priority Data
Jan. 30, 2017 (JP) .................. 2017-014153

(51) Int. Cl.
| | | |
|---|---|---|
| *H04N 1/04* | (2006.01) | |
| *H04N 1/00* | (2006.01) | |
| *G06K 7/10* | (2006.01) | |
| *G06K 7/14* | (2006.01) | |
| *G06K 9/00* | (2006.01) | |

(52) U.S. Cl.
CPC ..... *H04N 1/00076* (2013.01); *G06K 7/10722* (2013.01); *G06K 7/1417* (2013.01); *G06K 9/00671* (2013.01); *H04N 1/00037* (2013.01); *H04N 1/0097* (2013.01); *H04N 1/00307* (2013.01); *H04N 1/00477* (2013.01)

(58) Field of Classification Search
CPC .......... H04N 1/00076; H04N 1/00037; H04N 1/00307; H04N 1/0097; H04N 1/00477
USPC ................................. 358/1.14, 1.15
See application file for complete search history.

(56) References Cited

U.S. PATENT DOCUMENTS

| | | | |
|---|---|---|---|
| 9,235,819 B2* | 1/2016 | Torii | .................. G06F 11/0733 |
| 2011/0115816 A1* | 5/2011 | Brackney | ............... G06Q 10/06 345/629 |
| 2013/0114100 A1 | 5/2013 | Torii et al. | |

FOREIGN PATENT DOCUMENTS

JP        2013-140563        7/2013

* cited by examiner

*Primary Examiner* — Houshang Safaipour (57) ABSTRACT

Upon detecting an internal error, an image forming apparatus displays a 2-dimensional code obtained by encoding guide data corresponding to an error type of the detected internal error, the guide data indicating (a) a distance and a direction to a guide object and (b) a guide text. A mobile terminal apparatus (a) photographs the 2-dimensional code, (b) decodes the photographed 2-dimensional code to guide data, (c) detects a direction of the mobile terminal apparatus using a direction detecting device, and (d) displays a scene image being photographed by an imaging device and notifies a user of a location of the guide object by displaying a guide marker with the guide text onto the scene image, the guide marker corresponding to (d1) a difference between the detected direction of the mobile terminal apparatus and the direction to the guide object and (d2) the distance to the guide object.

6 Claims, 11 Drawing Sheets

| ERROR TYPE | DIRECTION[DEGREE] | DISTANCE[METER] | GUIDE TEXT |
|---|---|---|---|
| TONER EMPTY | 40 | 4 | ADMINISTRATOR MR. XX |
| TONER EMPTY | 80 | 5 | TONER STORAGE PLACE |

IMAGE FORMING SYSTEM, IMAGE FORMING APPARATUS, AND NON-TRANSITORY COMPUTER READABLE RECORDING MEDIUM STORING GUIDE PROGRAM

CROSS-REFERENCE TO RELATED APPLICATIONS

This application relates to and claims priority rights from Japanese Patent Application No. 2017-014153, filed on Jan. 30, 2017, the entire disclosures of which are hereby incorporated by reference herein.

BACKGROUND

1. Field of the Present Disclosure

The present disclosure relates to an image forming system, an image forming apparatus, and a non-transitory computer readable recording medium storing guide program.

2. Description of the Related Art

In a system, when an error occurs in an image forming apparatus, a mobile device displays AR (Augmented Reality) guidance that shows an error resolution operation.

If replenishment or replacement of consumables such as toner is required for resolving the error or if administrator's assistance is needed for resolving the error, a user needs to know a storage place of the consumables or a location of the administrator. For example, if the user does not know a procedure of replenishment or replacement of consumables or if the storage place is locked and the administrator has a key for unlocking, administrator's assistance is required. However, a normal user often does not know such a location of the consumables, the administrator or the like in advance and therefore often can not resolve the error immediately.

In addition, such a location of the consumables, the administrator or the like is different between sites such as offices, and therefore, common guidance can not resolve the aforementioned problem.

SUMMARY

An image forming system according to an aspect of the present disclosure includes an image forming apparatus and a mobile terminal apparatus. The image forming apparatus includes a first display device, and detects an internal error and upon detecting the internal error displays on the first display device a 2-dimensional code obtained by encoding guide data corresponding to an error type of the detected internal error, the guide data indicating (a) a distance and a direction to a guide object and (b) a guide text. The mobile terminal apparatus includes a second display device, and (a) photographs the 2-dimensional code using an imaging device, (b) decodes the photographed 2-dimensional code to the guide data, (c) detects a direction of the mobile terminal apparatus using a direction detecting device, and (d) displays a scene image being photographed by the imaging device on the second display device and notifies a user of a location of the guide object by displaying a guide marker with the guide text onto the scene image, the guide marker corresponding to (d1) a difference between the detected direction of the mobile terminal apparatus and the direction to the guide object and (d2) the distance to the guide object.

An image forming apparatus according to an aspect of the present disclosure includes a display device, a storage device, and an error processing unit. In the storage device, guide data is stored, the guide data indicating (a) a distance and a direction to a guide object corresponding to an error type and (b) a guide text. The error processing unit is configured, upon detecting an internal error, (a) to determine a distance and a direction to a guide object and a guide text, the distance, the direction and the guide text corresponding to an error type of the detected internal error; (b) to generate a 2-dimensional code by encoding the determined distance, the determined direction and the determined guide text; and (c) to display the generated 2-dimensional code on the display device.

A non-transitory computer readable recording medium according to an aspect of the present disclosure stores a guide program. The guide program causes a computer built in a mobile terminal apparatus to act as: a guide data acquiring unit configured to photograph using an imaging device of the mobile terminal apparatus a 2-dimensional code displayed on an image forming apparatus in which an internal error occurs, and acquire a distance and a direction to a guide object and a guide text by decoding the 2-dimensional code, the distance, the direction and the guide text corresponding to an error type of the internal error; and a guide display control unit configured to (a) display a scene image being photographed by the imaging device on a display device of the mobile terminal apparatus and (b) notify a user of a location of the guide object by displaying a guide marker with the guide text onto the scene image, the guide marker corresponding to (b1) a difference between the detected direction of the mobile terminal apparatus and the direction to the guide object and (b2) the distance to the guide object.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
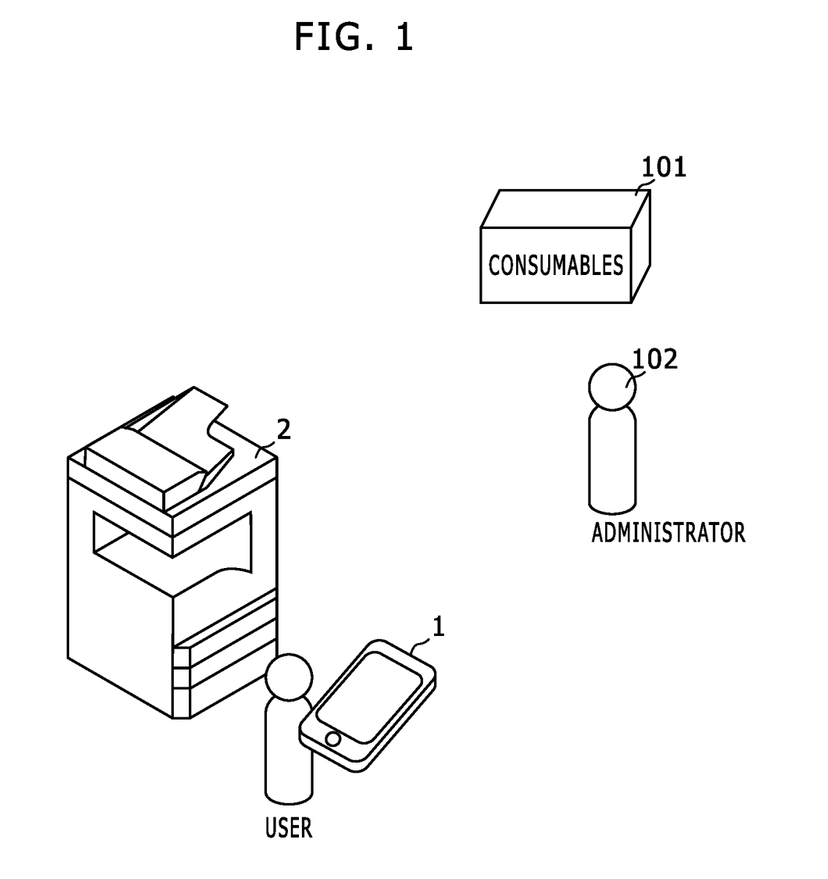
FIG. 1 shows a diagram that indicates a configuration of an image forming system in an embodiment of the present disclosure.

FIG. 1 shows a block diagram that indicates a configuration of an image forming system in an embodiment of the present disclosure. In the system shown in FIG. 1, a mobile terminal apparatus 1 such as a smartphone is carried by a user who uses an image forming apparatus 2.

Consumables 101 such as toner used in the image forming apparatus 2 is stored in another place than a location of the image forming apparatus 2. When replenishing the image forming apparatus 2 with the consumables 101 or replacing a consumables in the image forming apparatus 2 with the consumables 101 (i.e. new consumables), a user needs to go to get the consumables 101. Further, if administrator's assistance is needed for resolving an error such as toner empty, a user needs to go to ask an administrator 102.

The image forming apparatus 2 detects an internal error, and upon detecting the internal error, the image forming apparatus 2 displays a 2-dimensional code obtained by encoding guide data corresponding to an error type of the detected internal error. This guide data indicates (a) a distance and a direction to a guide object (the aforementioned consumables 101, the aforementioned administrator 102 or the like) and (b) a guide text. The mobile terminal apparatus 1 (a) photographs the 2-dimensional code using an imaging device, (b) decodes the photographed 2-dimensional code to guide data, (c) detects a direction of the mobile terminal apparatus 1 using a direction detecting device 15, and (d) displays a scene image being photographed by the imaging device and notifies a user of a location of the guide object by displaying a guide marker with the guide text onto the scene image. This guide marker corresponds to (d1) a difference between the detected direction of the mobile terminal apparatus and the direction to the guide object and (d2) the distance to the guide object. Thus, in the mobile terminal apparatus 1, the guide marker is displayed as augmented reality.

Figure 2:
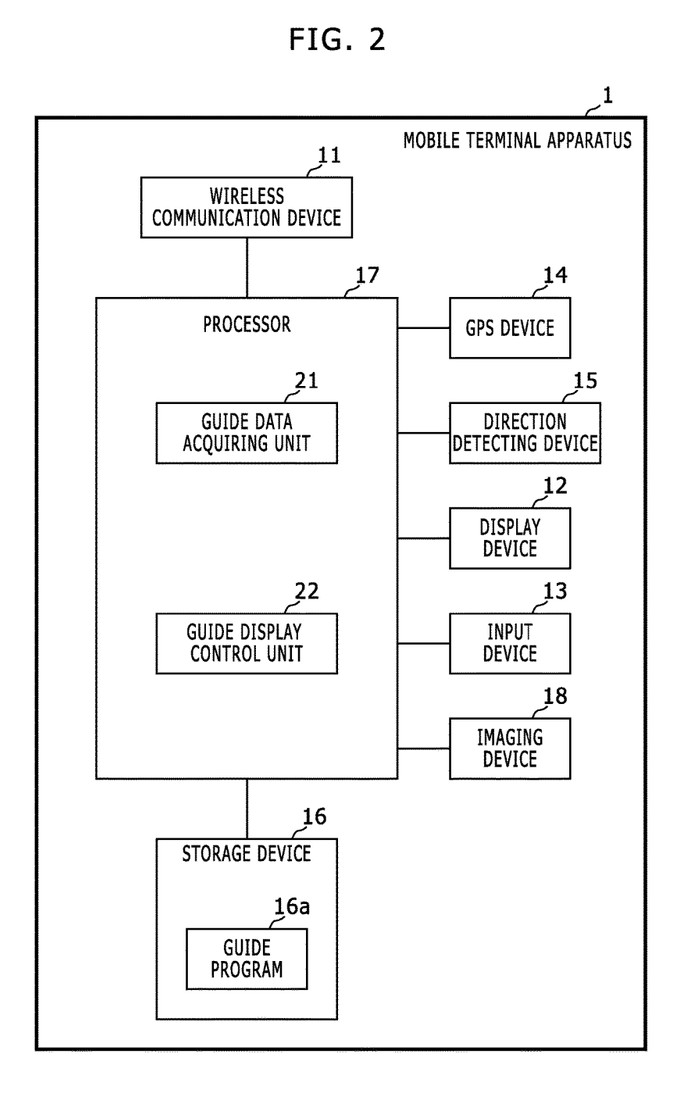
FIG. 2 shows a block diagram that indicates a configuration of a mobile terminal device 1 shown in FIG. 1.

FIG. 2 shows a block diagram that indicates a configuration of a mobile terminal device 1 shown in FIG. 1.

The mobile terminal apparatus 1 includes a wireless communication device 11, a display device 12, an input device 13, a GPS device 14, a direction detecting device 15, a storage device 16, a processor 17, and an imaging device 18.

The wireless communication device 11 is a communication circuit according to a predetermined a wireless communication standard. The wireless communication device 11 is a wireless LAN interface and/or a mobilephone network interface (an RF interface, a baseband unit and the like).

The display device 12 is a device such as a liquid crystal display arranged on a housing of the mobile terminal apparatus 1 and displays sorts of screens to a user.

The input device 13 is a device such as a touch panel arranged on the display device 12 and detects a user operation.

The GPS device 14 is a device that determines an absolute position (latitude, longitude, and altitude) of this GPS device 14, i.e. the mobile terminal apparatus 1 using GPS (Global Positioning System).

The direction detecting device 15 is a device that includes a gyro sensor, an electromagnetic compass or the like and detects a posture (a direction) of the mobile terminal apparatus 1.

The storage device 16 is a nonvolatile storage device such as a flash memory and stores a program and data. The storage device 16 stores a guide program 16a as an application program.

Further, the processor 17 is a computer that includes a CPU (Central Processing Unit), a ROM (Read Only Memory), a RAM (Random Access Memory) and the like, and loads a program to the RAM from the storage device 16, the ROM or the like and executes the program using the CPU and thereby acts as sorts of processing units.

In this embodiment, by executing the guide program 16a, the processor 17 acts as a guide data acquiring unit 21 and a guide display control unit 22.

The guide data acquiring unit 21 photographs, using the imaging device 18, a 2-dimensional code displayed on the image forming apparatus 2 in which an internal error occurs, and acquires a distance and a direction to a guide object and a guide text by decoding the 2-dimensional code. This distance, this direction and this guide text correspond to an error type of the internal error.

The guide display control unit 22 (a) displays a scene image (for example, a photographed image of a scene in a site such as an office) being photographed by the imaging device 18 on the display device 12 and (b) notifies a user of a location of the guide object by displaying a guide marker with the guide text onto the scene image. This guide marker corresponds to (b1) a difference between the direction of the mobile terminal apparatus 1 detected by the direction detecting device 15 and the direction to the guide object and (b2) the distance to the guide object.

In this embodiment, the guide marker has an arrow shape, and the guide display control unit 22 (a) displays the guide marker as the arrow shape pointing downwardly in a display screen of the display device 12 if a difference between a direction of the mobile terminal apparatus 1 and the acquired direction to the guide object is equal to or less than a predetermined threshold value (e.g. 5 degrees), and (b) if the difference is larger than the threshold value, (b1) displays the guide marker as the arrow shape pointing leftwardly in a display screen of the display device 12 if the direction of the mobile terminal apparatus 1 points to a right side of the acquired direction to the guide object and (b2) displays the guide marker as the arrow shape pointing rightwardly in a display screen of the display device 12 if the direction of the mobile terminal apparatus 1 points to a left side of the acquired direction to the guide object.

Further, in this embodiment, the guide display control unit 22 displays the guide marker at a more upper part in a display screen of the display device 12 for the guide object to which the distance is longer.

Figure 3:
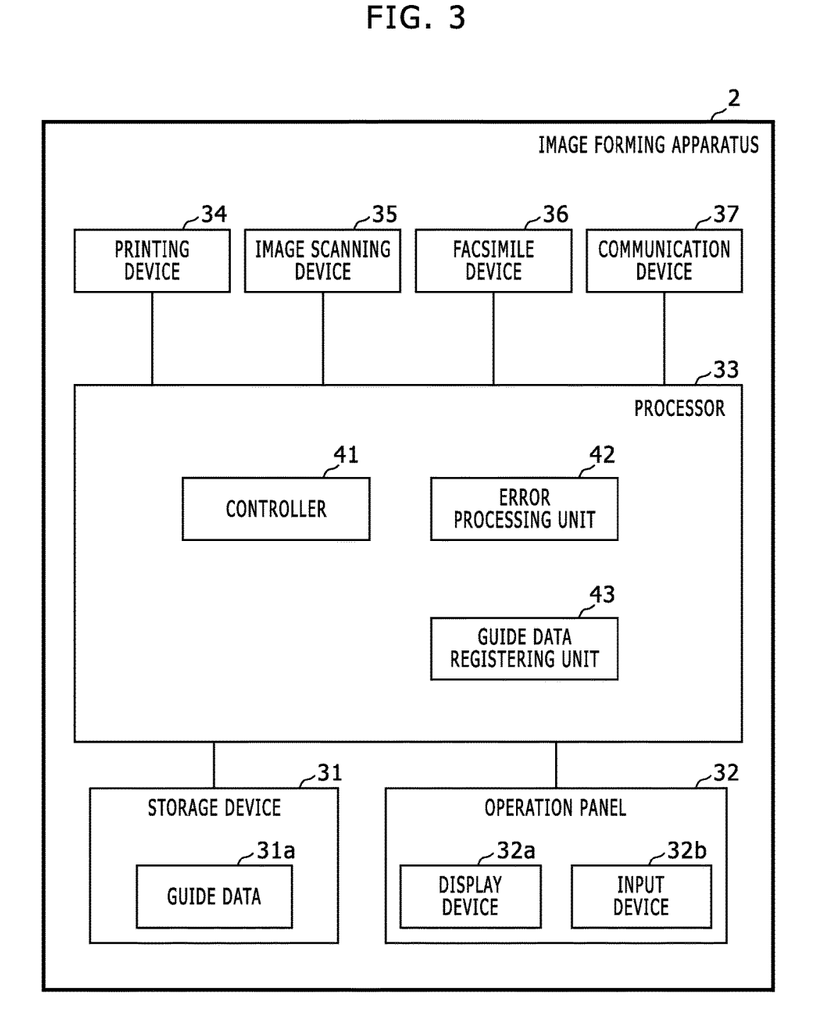
FIG. 3 shows a block diagram that indicates a configuration of an image forming apparatus 2 shown in FIG. 1.

FIG. 3 shows a block diagram that indicates a configuration of an image forming apparatus 2 shown in FIG. 1.

The image forming apparatus 2 shown in FIG. 1 includes a storage device 31, an operation panel 32, a processor 33, a printing device 34, an image scanning device 35, a facsimile device 36, a communication device 37 and the like.

The storage device 31 is a nonvolatile storage device such as a flash memory, and guide data 31a is stored in the storage device 31.

The guide data 31a indicates (a) a distance and a direction to a guide object and (b) a guide text that correspond to an error type of an internal error of the image forming apparatus 2. The guide object is a destination (i.e. a target article or a target person) to which a user should be guided and is an object (the new consumables 101, the administrator 102 or the like) required for resolving the internal error.

The operation panel 32 is arranged in a front side on an upper surface of the housing, and includes a display device 32a such as a liquid crystal display and an input device 32b such as a touch panel. The display device 32a displays sorts of screens to a user, and the input device 32b receives a user operation inputted by a user.

Further, the processor 33 is a computer that includes a CPU, a ROM, and a RAM, and loads a program to the RAM from the ROM or an unshown storage device and executes the program using the CPU and thereby acts as sorts of processing units. The processor 33 acts as a controller 41, an error processing unit 42, and a guide data registering unit 43.

The printing device 34 prints a document image or the like on a printing paper sheet on the basis of image data. Further, the image scanning device 35 optically scans a document image of a document and generates image data of the document image. The facsimile device 36 generates and transmits a facsimile signal of a document image or the like based on image data, and receives a facsimile signal from an external device and generates image data from the received facsimile signal. The communication device 37 is a network interface or the like, and performs data communication with an external device (e.g. the mobile terminal apparatus 1, another host device such as a personal computer, or the like).

The controller 41 controls internal devices such as the printing device 34, the image scanning device 35, the facsimile device 36, and the communication device 37, and thereby performs sorts of processes. Further, upon detecting an error (i.e. an internal error) in the processes in the internal devices, the controller 41 notifies the error processing unit 42 of the detection of the internal error.

Upon detecting an internal error, the error processing unit 42 (a) on the basis of the guide data 31a, determines a distance and a direction to a guide object and a guide text that correspond to an error type of the detected internal error, (b) generates a 2-dimensional code by encoding the determined distance, the determined direction and the determined guide text; and (c) displays the generated 2-dimensional code on the display device 32a. Here the 2-dimensional code is, for example, a QR code (registered trademark).

When the communication device 37 receives a guide data registration request from an external device, the guide data registering unit 43 adds to the guide data 31a an error type, a distance to a guide object, a direction to the guide object, and a guide text specified by the guide data registration request so as to be associated with each other. Consequently, the administrator or the like can easily create the guide data 31a suitable to an own site of the administrator or the like on the basis of relative positional relationships of the own site among the image forming apparatus 2, a storage place of the consumables 101, a location (a seat or the like) of the administrator 102 and the like.

Figure 4:
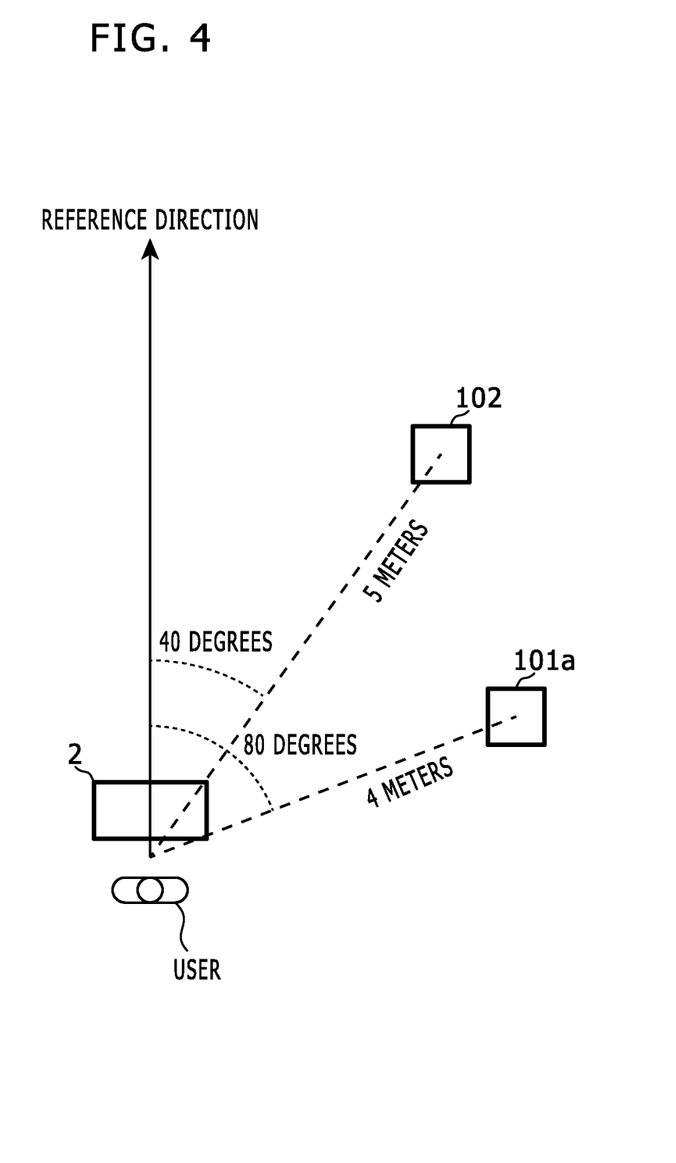
FIG. 4 shows a diagram that indicates an example of relative position relationships among the image forming apparatus 2, a storage place of consumables 101, and a location of an administrator 102 in the image forming system shown in FIG. 1.
Figure 5:
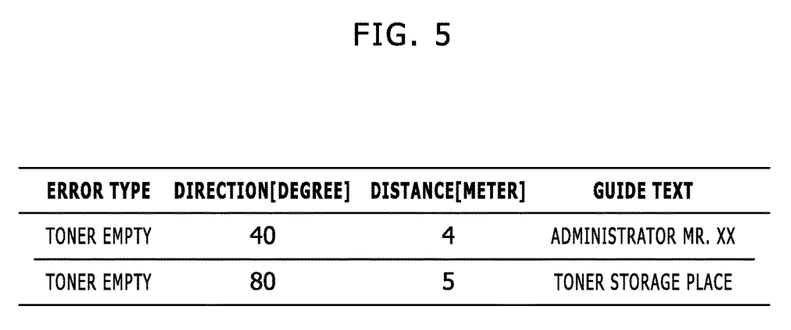
FIG. 5 shows a diagram that indicates an example of guide data in case of the relationships shown in FIG. 4.

FIG. 4 shows a diagram that indicates an example of relative position relationships among the image forming apparatus 2, a storage place of consumables 101, and a location of an administrator 102 in the image forming system shown in FIG. 1. FIG. 5 shows a diagram that indicates an example of guide data in case of the relationships shown in FIG. 4.

A front direction of a user who confronts the operation panel 32 of the image forming apparatus 2 is set as a reference direction, and a direction to a guide object (here, a toner cartridge 101a as the consumables 101 or the administrator 102) is expressed as an angle from the reference direction, and a distance to a guide object is a distance from the image forming apparatus 2 to the guide object. Here, an angle to the right side of the reference direction is expressed as a positive angle, and an angle to the left side of the reference direction is expressed as a negative angle. For example, the reference direction is set as a direction of the mobile terminal apparatus 1 at a time point when the 2-dimensional code is photographed, and an angle from the reference direction is detected as a direction of the mobile terminal apparatus 1 at each time point by the direction detecting device 15.

In a situation shown in FIG. 4, the direction to the toner cartridge 101a is 80 degrees, and the distance to the toner cartridge 101a is 4 meters; and the direction to the administrator 102 is 40 degrees, and the distance to the administrator 102 is 5 meters. In addition, if the toner cartridge 101a and the administrator 102 are set as guide objects of a toner empty error, the guide data 31a is created as shown in FIG. 5. In the guide data 31a shown in FIG. 5, "ADMINISTRATOR MR. XX" is registered as the guide text of the administrator 102, and "TONER STORAGE PLACE" is registered as the guide text of the toner cartridge 101a.

The following part explains a behavior of the aforementioned image forming system.

Figure 6:
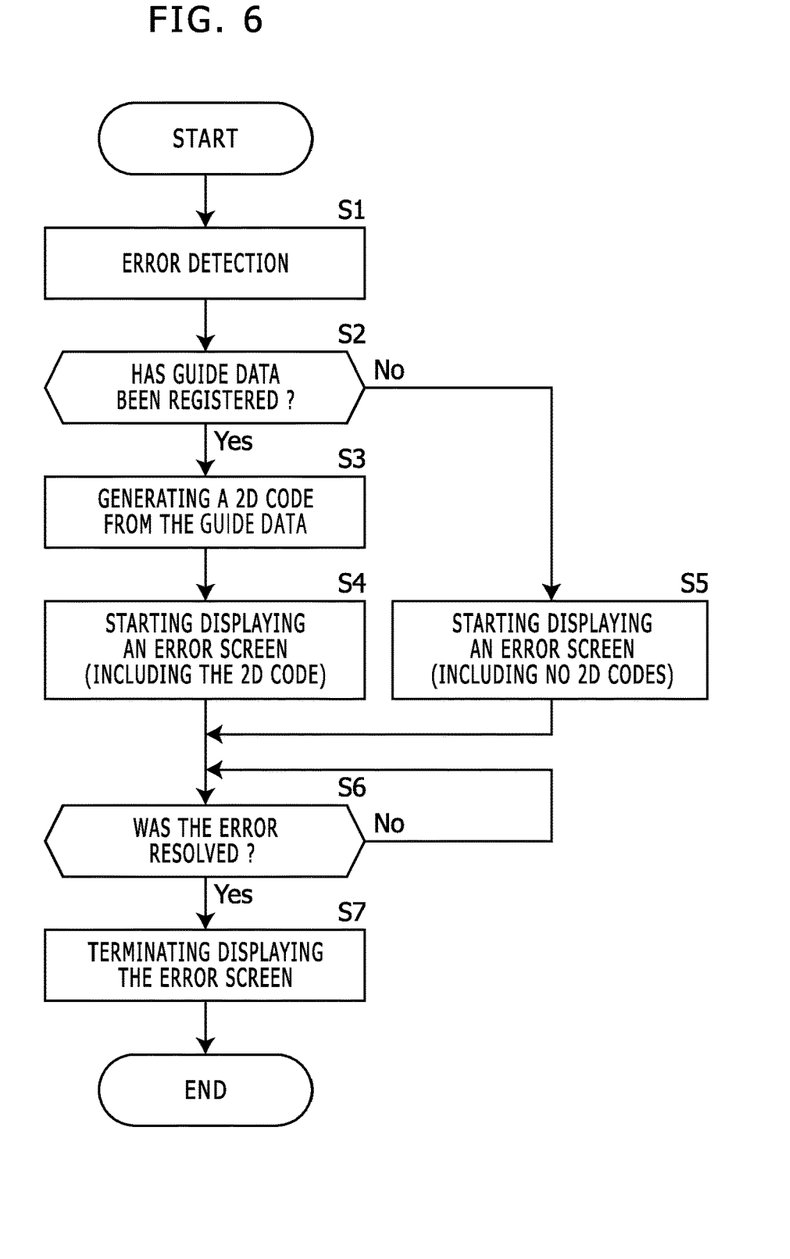
FIG. 6 shows a flowchart that explains a behavior of the image forming apparatus 2 shown in FIGS. 1 and 3 when detecting an error.

Firstly, the following part explains a behavior of the image forming apparatus 2 in which an error was detected. FIG. 6 shows a flowchart that explains a behavior of the image forming apparatus 2 shown in FIGS. 1 and 3 when detecting an error.

In the image forming apparatus 2, when the controller detects an internal error (in Step S1), the error processing unit 42 determines whether the guide data 31a corresponding to an error type of the internal error is registered or not (in Step S2).

Figure 7:
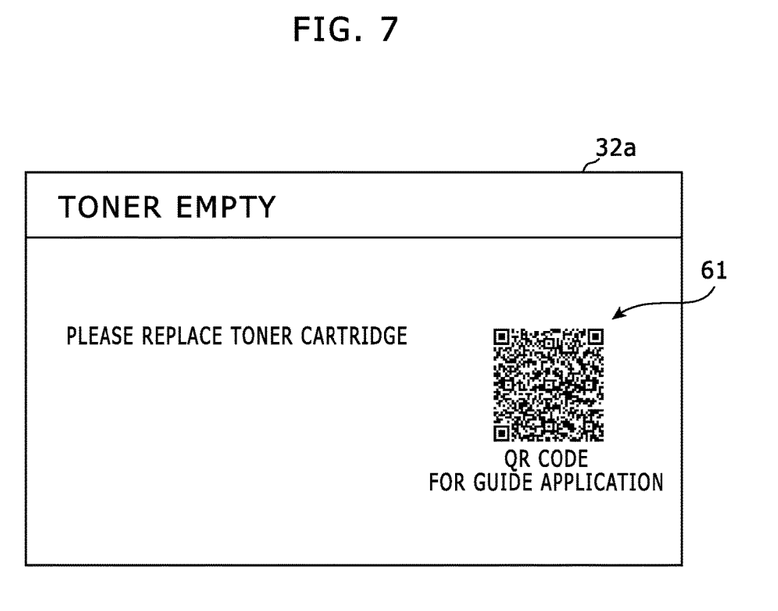
FIG. 7 shows a diagram that indicates an example of an error screen displayed when detecting an error of the image forming apparatus 2 shown in FIGS. 1 and 3.

If the guide data 31a corresponding to the error type of the internal error is registered, then the error processing unit 42 determines a distance and a direction to a guide object and a guide text corresponding to the error type of the internal error on the basis of the guide data 31a, and generates a 2-dimensional code by encoding the distance, the direction and the guide text (in Step S3). Subsequently, the error processing unit 42 starts displaying an error screen that includes the 2-dimensional code (in Step S4). FIG. 7 shows a diagram that indicates an example of an error screen displayed when detecting an error of the image forming apparatus 2 shown in FIGS. 1 and 3. As shown in FIG. 7, the 2-dimensional code 61 is displayed on the display device 32a.

Contrarily, if the guide data 31 corresponding to the error type of the internal error is not registered, the error processing unit 42 starts displaying an error screen that does not include the aforementioned 2-dimensional code (in Step S5).

Afterward, as mentioned below, the mobile terminal apparatus 1 performs guide displaying and shows to a user a location of an article and/or a person required for resolving the error. The user manually resolves the error by referring to the guide displaying.

Meanwhile, after the detection of the internal error, the controller 41 watches whether the internal error was resolved or not (in Step S6), and if the controller 41 detects that the internal error was resolved, the error processing unit 42 immediately terminates displaying the aforementioned error screen (in Step S7).

Figure 8:
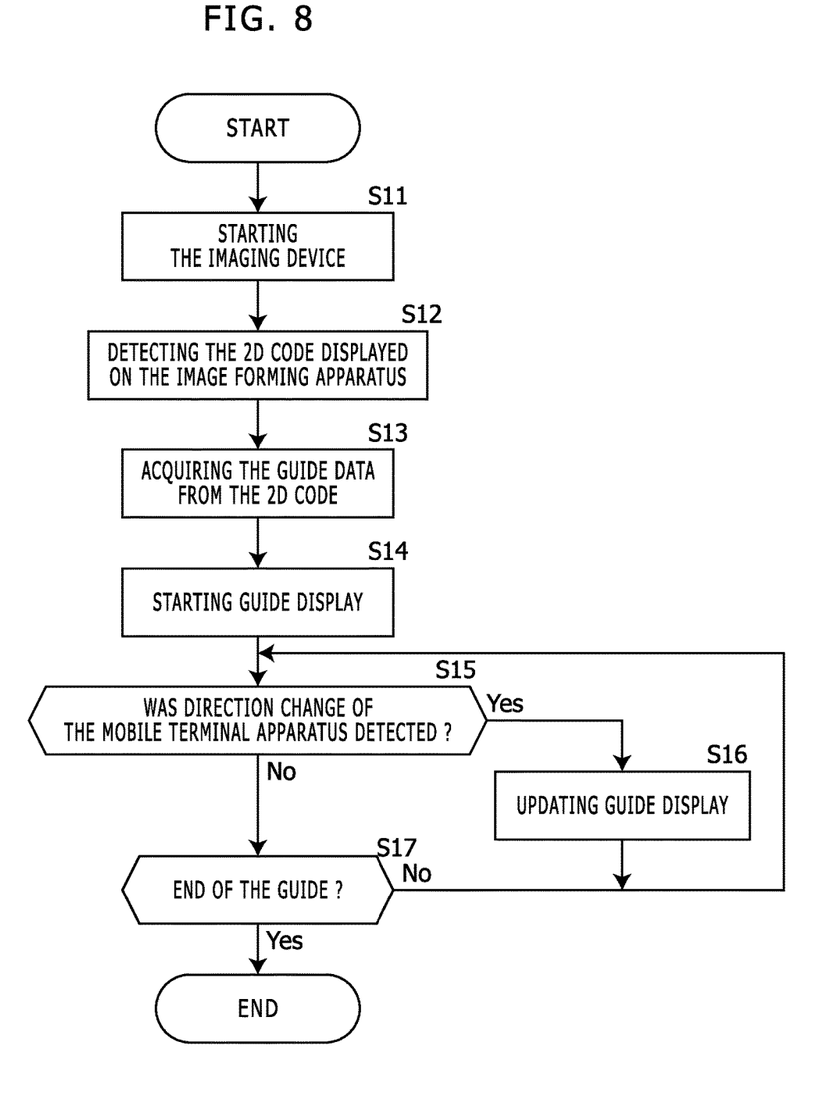
FIG. 8 shows a flowchart that explains a behavior of the mobile terminal apparatus 1 shown in FIGS. 1 and 2.

The following part explains a behavior of the mobile terminal apparatus 1 for the guide displaying. FIG. 8 shows a flowchart that explains a behavior of the mobile terminal apparatus 1 shown in FIGS. 1 and 2.

As mentioned, in the image forming apparatus 2, when the 2-dimensional code 61 is displayed for the guide, the user operates the mobile terminal apparatus 1 and thereby causes the processor 17 to execute the guide program 16a. Consequently, the processor 17 acts as the guide data acquiring unit 21 and the guide display control unit 22.

Firstly, the guide data acquiring unit 21 starts the imaging device 18 (in Step S11). Consequently, photographed images of the imaging device 18 are provided to the guide data acquiring unit 21 on real time basis.

The user adjusts a direction of the mobile terminal apparatus 1 so that a view field of the imaging device 18 includes the 2-dimensional code 61 displayed on the image forming apparatus 2. Upon photographing the 2-dimensional code 61, the guide data acquiring unit 21 detects the 2-dimensional code in the photographed image (in Step S12).

Subsequently, the guide data acquiring unit 21 decodes the 2-dimensional code and thereby acquires the guide data (i.e. a direction and a distance to a guide object, and a guide text) (in Step S13).

Upon acquiring the guide data, the guide display control unit 22 starts the guide displaying as mentioned (in Step S14).

Subsequently, the guide display control unit 22 watches whether change of a direction of the mobile terminal apparatus 1 is detected by the direction detecting device 15 or not (in Step S15).

Upon detecting change of a direction of the mobile terminal apparatus 1 by the direction detecting device 15, the guide display control unit 22 determines a current direction of the mobile terminal apparatus 1, and updates the guide displaying (i.e. the displayed guide) on the basis of the determined current direction of the mobile terminal apparatus 1 (in Step S16).

As mentioned, until a guide termination operation is inputted to the mobile terminal apparatus 1 (in Step S17), the guide displaying is updated every time when change of a direction of the mobile terminal apparatus 1 is detected.

Figure 9:
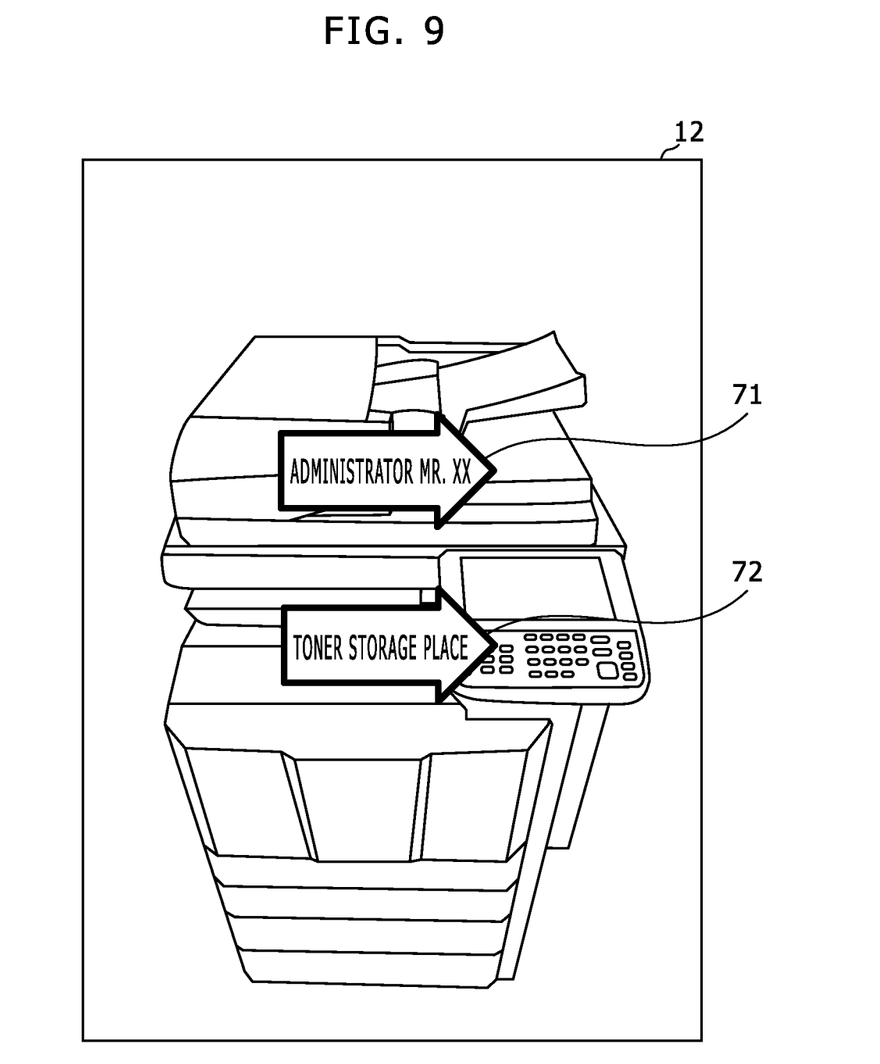
FIG. 9 shows a diagram that indicates an example of a guide display screen displayed on the mobile terminal apparatus 1 shown in FIGS. 1 and 2 (1/3)
Figure 10:
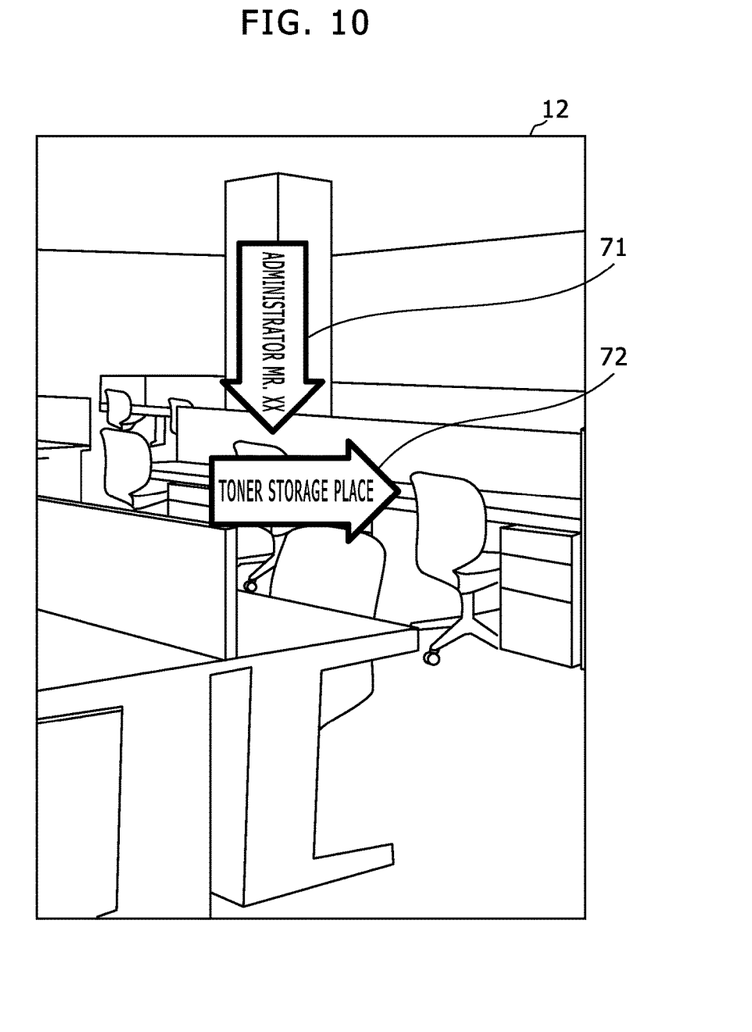
FIG. 10 shows a diagram that indicates an example of a guide display screen displayed on the mobile terminal apparatus 1 shown in FIGS. 1 and 2 (2/3)
Figure 11:
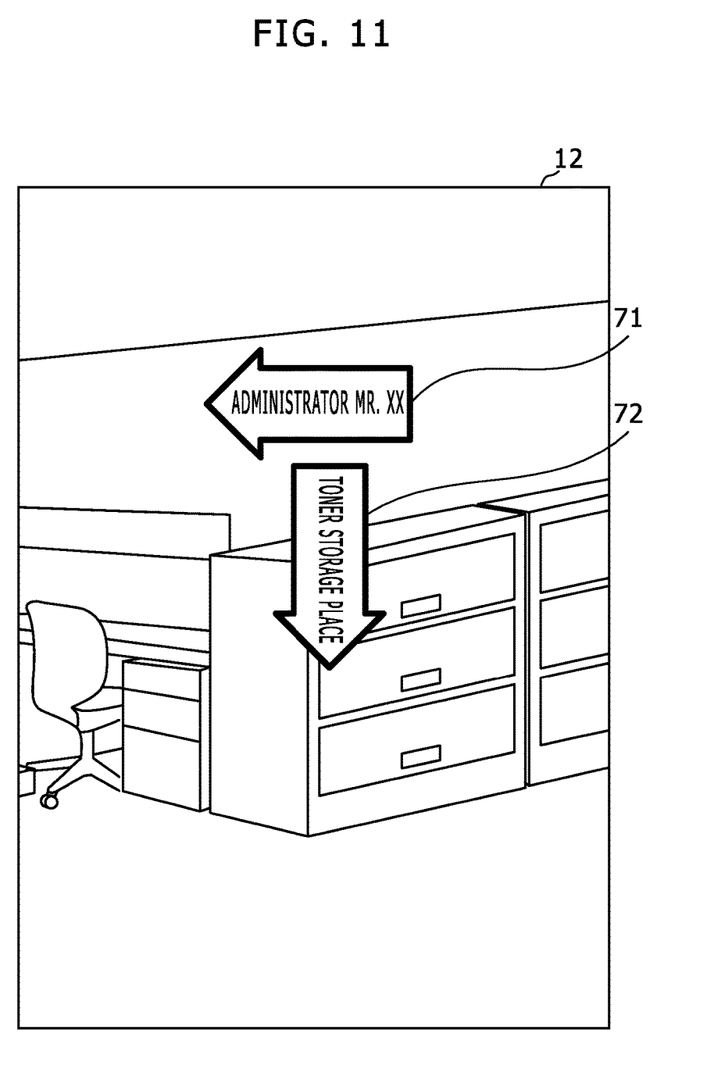
FIG. 11 shows a diagram that indicates an example of a guide display screen displayed on the mobile terminal apparatus 1 shown in FIGS. 1 and 2 (3/3).

FIGS. 9 to 11 show diagrams that indicate examples of a guide display screen displayed on the mobile terminal apparatus 1 shown in FIGS. 1 and 2. The guide display screen shown in FIGS. 9 to 11 is one in case of FIGS. 4 and 5.

The guide displaying is started immediately after photographing the 2-dimensional code 61, and therefore, as shown in FIG. 9, the image forming apparatus 2 is included in a scene image. As shown in FIG. 9, guide markers 71 and 72 are displayed with guide texts on the basis of a current direction of the mobile terminal apparatus 1 at that time. In this status, a front direction of the user (i.e. the current direction of the mobile terminal apparatus 1) is in the left sides of the direction to the toner cartridge 101a (i.e. the consumables 101) and the direction to the administrator 102, and therefore, the guide markers 71 and are displayed so as to point rightwardly. Here, the distance to the toner cartridge 101a (the consumables 101) is longer than the distance to the administrator 102, and therefore, the guide marker 71 of the administrator 102 is displayed at a more upper part than the guide marker 72 of the toner cartridge 101a (the consumables 101) in the display screen.

Afterward, the user changes the direction of the mobile terminal apparatus 1 rightwardly in accordance with the directions of the guide markers 71 and 72. If the direction of the mobile terminal apparatus 1 substantially agrees with the direction to the administrator 102, then as shown in FIG. 10, the guide marker 71 of the administrator 102 is displayed so as to point downwardly. The guide markers 71 and 72 are displayed on the current scene image. Consequently, the user can visually recognize the location of the administrator 102.

The user further changes the direction of the mobile terminal apparatus 1 rightwardly in accordance with the direction of the guide marker 72. If the direction of the mobile terminal apparatus 1 substantially agrees with the direction to the toner cartridge 101a (the consumables 101), then as shown in FIG. 11, the guide marker 72 of the toner cartridge 101a (the consumables 101) is displayed so as to point downwardly. The guide markers 71 and 72 are displayed on the current scene image. Consequently, the user can visually recognize the location of the toner cartridge 101a (the consumables 101). In this situation, the direction of the mobile terminal apparatus 1 is in the right side of the direction to the administrator 102, and therefore, the guide marker 71 is displayed so as to point leftwardly. Consequently, the user can visually recognize the location of the administrator 102.

As mentioned, the user can find the locations of the toner cartridge 101a (the consumables 101) and/or the administrator 102 required for resolving the toner empty error.

In the aforementioned embodiment, upon detecting an internal error, the image forming apparatus 2 displays a 2-dimensional code obtained by encoding guide data 31a corresponding to an error type of the detected internal error. This guide data indicates (a) a distance and a direction to a guide object and (b) a guide text. The mobile terminal apparatus 1 (a) photographs the 2-dimensional code using the imaging device 18, (b) decodes the photographed 2-dimensional code to guide data, (c) detects a direction of the mobile terminal apparatus 1 using the direction detecting device, and (d) displays on the display device 12 a scene image being photographed by the imaging device 18 and notifies a user of a location of the guide object by displaying a guide marker with the guide text onto the scene image. This guide marker corresponds to (d1) a difference between the detected direction of the mobile terminal apparatus and the direction to the guide object and (d2) the distance to the guide object.

Consequently, even if an object (the consumables 101, the administrator 102 or the like) required for resolving an error is located at another place than the image forming apparatus 2, the object is indicated to a user so as for the user to visually and easily understand it.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the guide program 16a may be recorded in a portable recording medium. In such a case, for example, the guide program 16a is installed from the recording medium to the mobile terminal apparatus 1. Alternatively, the guide program 16a may be downloaded from a server by the communication device 37 and installed in the mobile terminal apparatus 1.

What is claimed is:

1. An image forming system, comprising:
an image forming apparatus; and
a mobile terminal apparatus;
wherein the image forming apparatus comprises a first display device, and detects an internal error and upon detecting the internal error displays on the first display device an 2-dimensional code obtained by encoding guide data corresponding to an error type of the detected internal error, the guide data indicating (a) a distance and a direction to a guide object and (b) a guide text; and
the mobile terminal apparatus comprises a second display device, and (a) photographs the 2-dimensional code using an imaging device, (b) decodes the photographed 2-dimensional code to the guide data, (c) detects a direction of the mobile terminal apparatus using a direction detecting device, and (d) displays a scene image being photographed by the imaging device on the second display device and notifies a user of a location of the guide object by displaying a guide marker with the guide text onto the scene image, the guide marker corresponding to (d1) a difference between the detected direction of the mobile terminal apparatus and the direction to the guide object and (d2) the distance to the guide object.

2. An image forming apparatus, comprising:
a display device;
a storage device in which guide data is stored, the guide data indicating (a) a distance and a direction to a guide object corresponding to an error type and (b) a guide text; and
an error processing unit configured, upon detecting an internal error, (a) to determine a distance and a direction to a guide object and a guide text, the distance, the direction and the guide text corresponding to an error type of the detected internal error; (b) to generate a 2-dimensional code by encoding the determined distance, the determined direction and the determined guide text; and (c) to display the generated 2-dimensional code on the display device.

3. The image forming apparatus according to claim 2, further comprising a communication device, and a guide data registering unit;
wherein when the communication device receives a guide data registration request, the guide data registering unit adds an error type, a distance to a guide object, a direction to a guide object and a guide text to the guide data so as to be associated with each other, the error type, the distance, the direction and the guide text specified by the guide data registration request.

4. A non-transitory computer readable recording medium storing a guide program, wherein the guide program causes a computer built in a mobile terminal apparatus to act as:
a guide data acquiring unit configured to photograph using an imaging device of the mobile terminal apparatus a 2-dimensional code displayed on an image forming apparatus in which an internal error occurs, and acquire a distance and a direction to a guide object and a guide text by decoding the 2-dimensional code, the distance, the direction and the guide text corresponding to an error type of the internal error; and
a guide display control unit configured to (a) display a scene image being photographed by the imaging device on a display device of the mobile terminal apparatus and (b) notify a user of a location of the guide object by displaying a guide marker with the guide text onto the scene image, the guide marker corresponding to (b1) a difference between the detected direction of the mobile terminal apparatus and the direction to the guide object and (b2) the distance to the guide object.

5. The non-transitory computer readable recording medium storing a guide program according to claim 4, wherein the guide marker has an arrow shape; and
the guide display control unit (a) displays the guide marker as the arrow shape pointing downwardly in a display screen of the display device if a difference between a direction of the mobile terminal apparatus and the acquired direction to the guide object is equal to or less than a predetermined threshold value, and (b) if the difference is larger than the threshold value, (b1) displays the guide marker as the arrow shape pointing leftwardly in a display screen of the display device if the direction of the mobile terminal apparatus points to a right side of the acquired direction to the guide object and (b2) displays the guide marker as the arrow shape pointing rightwardly in a display screen of the display device if the direction of the mobile terminal apparatus points to a left side of the acquired direction to the guide object.

6. The non-transitory computer readable recording medium storing a guide program according to claim 4, wherein the guide display control unit displays the guide marker at a more upper part in a display screen of the display device for the guide object to which the distance is longer.

* * * * *